United States Patent
Gruet et al.

(10) Patent No.: US 10,045,363 B2
(45) Date of Patent: Aug. 7, 2018

(54) HD-FDD METHOD AND SYSTEM WITH NO OVERLAPPING BETWEEN DOWNLINK AND UPLINK SUBFRAMES

(71) Applicant: AIRBUS DS SAS, Elancourt (FR)

(72) Inventors: Christophe Gruet, Montigny le Bretonneux (FR); Eric Georgeaux, Montigny le Bretonneux (FR)

(73) Assignee: AIRBUS DS SAS, Elancourt (FR)

( * ) Notice: Subject to any disclaimer, the term of this patent is extended or adjusted under 35 U.S.C. 154(b) by 0 days.

(21) Appl. No.: 14/367,438

(22) PCT Filed: Dec. 3, 2012

(86) PCT No.: PCT/EP2012/074275
§ 371 (c)(1),
(2) Date: Jun. 20, 2014

(87) PCT Pub. No.: WO2013/092191
PCT Pub. Date: Jun. 27, 2013

(65) Prior Publication Data
US 2015/0215956 A1     Jul. 30, 2015

(30) Foreign Application Priority Data
Dec. 22, 2011   (FR) ..................................... 11 62337

(51) Int. Cl.
*H04W 72/10*     (2009.01)
*H04W 24/02*     (2009.01)
(Continued)

(52) U.S. Cl.
CPC .......... *H04W 72/10* (2013.01); *H04B 7/2656* (2013.01); *H04L 5/16* (2013.01);
(Continued)

(58) Field of Classification Search
None
See application file for complete search history.

(56) References Cited

U.S. PATENT DOCUMENTS 8,842,620 B2 * 9/2014 Hu ..................... H04L 5/0048
370/329
9,161,344 B2 * 10/2015 Frenne ................... H04L 5/001
(Continued)

FOREIGN PATENT DOCUMENTS

WO      2009/042158      4/2009

OTHER PUBLICATIONS

International Search Report and Written Opinion for Int. App. No. PCT/EP2012/074275, completed Feb. 15, 2013.

*Primary Examiner* — Steve R Young
(74) *Attorney, Agent, or Firm* — Pillsbury Winthrop Shaw Pittman LLP (57) ABSTRACT

A half-duplex (HD), frequency division duplexing (FDD), method for wireless communication systems, implementing an uplink and downlink prioritization respectively for a HD-FDD type mobile communication terminal during a transition between a downlink (DL) sub-frame, labelled n, and an uplink (UL) sub-frame, labelled n+1, in order to avoid overlapping of said sub-frames. This method comprises a step of sending by a base station an allocation message, a step of receiving the allocation message by said terminal and a step of processing said allocation message by said terminal.

26 Claims, 5 Drawing Sheets

(51) Int. Cl.
*H04L 5/16* (2006.01)
*H04W 72/04* (2009.01)
*H04B 7/26* (2006.01)
*H04L 5/00* (2006.01)
*H04W 28/22* (2009.01)

(52) U.S. Cl.
CPC ......... *H04W 24/02* (2013.01); *H04W 72/042* (2013.01); *H04L 5/0007* (2013.01); *H04L 5/0044* (2013.01); *H04W 28/22* (2013.01)

(56) References Cited

U.S. PATENT DOCUMENTS

| | | | |
|---|---|---|---|
| 9,258,832 B2* | 2/2016 | Noh | H04W 74/0833 |
| 9,794,814 B2* | 10/2017 | Kim | H04W 24/08 |
| 2006/0166688 A1* | 7/2006 | Sun | H04B 7/2681 |
| | | | 455/502 |
| 2009/0092067 A1* | 4/2009 | Sudarshan | H04B 7/2656 |
| | | | 370/281 |
| 2009/0185483 A1 | 7/2009 | McBeath et al. | |
| 2010/0177807 A1* | 7/2010 | Zhang | H04B 7/15564 |
| | | | 375/211 |
| 2011/0075760 A1* | 3/2011 | Ogawa | H04J 13/0055 |
| | | | 375/296 |
| 2012/0039221 A1* | 2/2012 | Lim | H04L 25/03114 |
| | | | 370/280 |
| 2013/0343322 A1* | 12/2013 | Lee | H04B 7/2656 |
| | | | 370/329 |
| 2014/0293840 A1* | 10/2014 | Beale | H04L 5/14 |
| | | | 370/277 |
| 2015/0334656 A1* | 11/2015 | Ji | H04W 52/0245 |
| | | | 370/252 |

* cited by examiner

HD-FDD METHOD AND SYSTEM WITH NO OVERLAPPING BETWEEN DOWNLINK AND UPLINK SUBFRAMES

CROSS REFERENCE TO RELATED APPLICATIONS

The present application is a U.S. National Phase Application pursuant to 35 U.S.C. § 371 of International Application No. PCT/EP2012/074275 filed Dec. 3, 2012, which claims priority to French Patent Application No. 1162337 filed Dec. 22, 2011. The entire disclosure contents of these applications are herewith incorporated by reference into the present application.

The field of the invention is that of duplexing schemes used in wireless communication systems, and more particularly that of half-duplex (HD) frequency division duplexing scheme.

TECHNICAL FIELD

Two duplexing modes exist in prior art:
frequency division duplexing (FDD) wherein two different frequency bands are used for the downlink (DL)—otherwise called reception—and for the uplink (UL)—otherwise called emission, and
time division duplexing (TDD) wherein a single frequency band is used for reception and emission. The emission and reception thus occur at different moments.

FDD duplexing requires a frequency spacing between the reception and emission bands, also called guard frequency band, whereas TDD duplexing requires a time spacing between an emission and a reception, called guard interval.

In the case of a TDD duplexing, the spacing should be sufficient to enable an emitted signal to reach a receiving terminal before the same is in an emission interval and thus its reception is inhibited. Even if this spacing is relatively short, when the status changes between the reception and emission modes several times a second, a short time spacing delay reduces the capability in proportion to this delay. This can be acceptable for communications on short distances but can become problematic on long distances.

In the case of a FDD type duplexing, it is necessary that the width of the guard frequency band be sufficient for the receiver not to be unduly affected by the signal of the emitter. To do this, the implementation of a very selective filtering can be required. Such filters should then be placed at the base station but also at the terminals. These filters have three major drawbacks: their bulk, power consumption and price. For systems whose width of the guard frequency band is low, for example in the order of 10 to 30 MHz, the use of such filters results in too must a cost and a bulk for portable mobile equipments.

A third duplexing mode, the HD-FDD ("Half-Duplex Frequency Division Duplexing") mode has also been proposed. As in the FDD mode, two different frequency bands are used for emission and reception. However, the emission and reception periods are spaced in time. Thus, it is no longer required to equip terminals and base stations with filters to separate both frequency bands. This duplexing mode can thus be contemplated for mobile and portable equipment.

This mode leads to introduce scheduling restrictions for the utilization of radio resources which are regularly allocated, for example every 1 ms in a LTE network.

Figure 1:
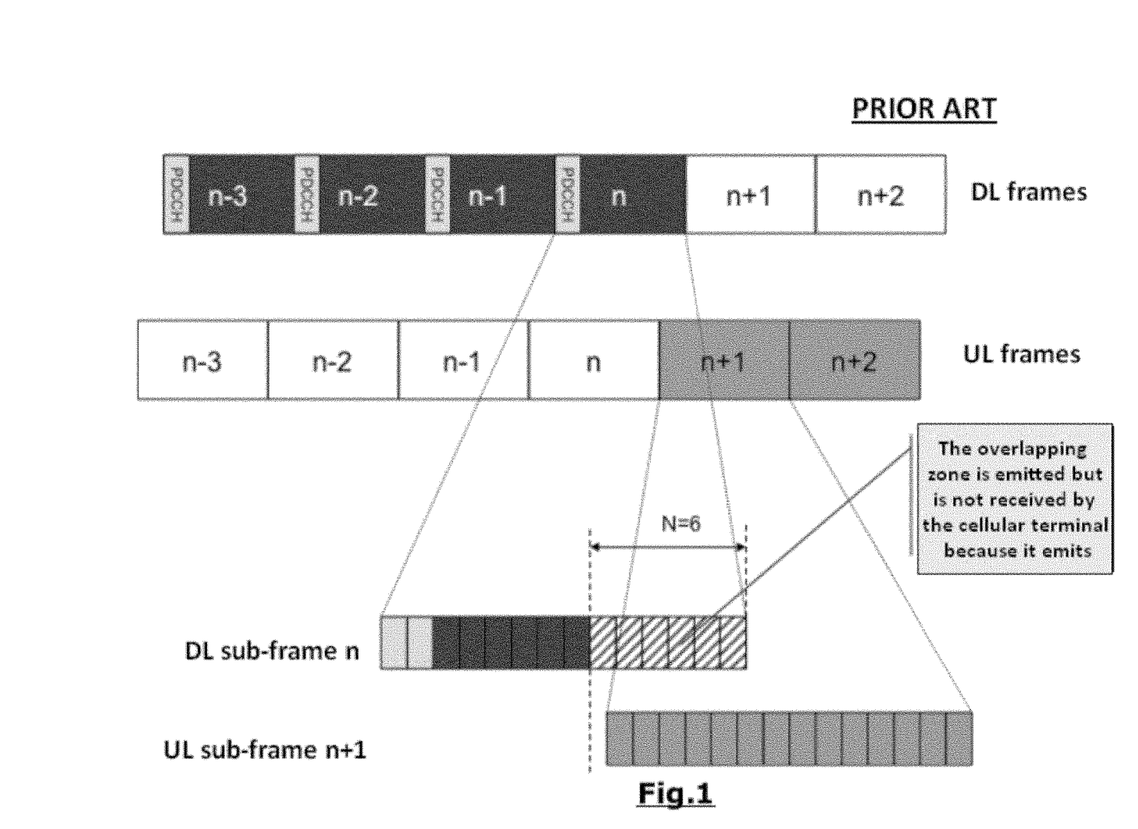
FIG. 1 illustrates a duplexing scheme representative of prior art.

The example of the LTE standard is herein used but the invention should be intended to be applicable to any radio standard requiring a scheduling. For the purpose to avoid a simultaneous utilization of both bands by a terminal the duplexing of which is of the HD-FDD type, as illustrated in FIG. 1, the radio resource scheduler located at the base station allocates the reception and emission intervals according to a transmission pattern in accordance with the standard used.

The LTE standard is a high rate data wireless communication standard for mobile phones and data terminals. The object of the LTE standard is to increase the capability and speed of wireless data networks using new DSP ("Digital Signal Processing") technologies as well as specific modulation techniques. The LTE standard has the capability to manage rapidly moving cellular terminals.

One of the specificities imposed by the LTE standard for the case of HD-FDD mode, is that a terminal receives a positive or negative acknowledgment which is to arrive at the latest 4 ms after each reception type allocation. The theoretical maximum rate would thus be reached by allocating four sub-frames (one millisecond each) to the downlink and four sub-frames (one millisecond each) to the uplink. This maximum rate is purely theoretical since a guard interval should be introduced between an emission and a reception as has been previously set forth in the case of TDD.

A possible duplexing scheme is known fulfilling this criterion and consisting in affecting three sub-frames (one millisecond each) to the downlink, followed by waiting for two empty time slots having a total duration of one millisecond, and then affecting three sub-frames (one millisecond each) to the uplink, followed by waiting for two empty time slots having a total duration of one millisecond. In this possibility, the time slots inserted between affectations to the uplink and downlink enable the terminal to easily switch from a reception status to an emission status and vice versa. It is then observed that this scheme only makes use of six useful sub-frames among eight. This scheme thus results in a rate which only accounts for 75% of the theoretical rate that may be expected in HD-FDD mode.

This possible scheme thus results in a high decrease in the effective rate view from a terminal.

Another possible duplexing scheme is known fulfilling this criterion. This scheme, standardized by the "3$^{rd}$ Generation Partnership Project (3GPP)" organisation, provides for the allocation of four downlink sub-frames followed by the allocation of four uplink sub-frames.

However, the time reference at the terminal is the signal emitted by the base station which in turn is received after a propagation time τ µs. The terminal has to start to emit sub-frames before the moment when the base station switches from a downlink allocation period to an uplink allocation period. The terminal has to anticipate for at least 2.τ µs its emission with respect to its reception in its time reference. The duration of this advance is defined in LTE as being TA ("Time Advance").

Thus, when the terminal has to start to emit such that the data it sends arrive at the start of the uplink period of the base station, the terminal is in the downlink allocation period of the base station. Consequently, the terminal cannot receive data emitted for the last 2.τ µs of the downlink allocation period.

The 3GPP standard thus allows the terminal not to receive the last part of the downlink allocation period.

Consequently, the 3GPP standard has the drawback to systematically favour the emission of the cellular terminal to its reception.

One purpose of the invention is to provide a method for dynamically prioritizing management of emission and reception blocks within the scope of implementing a duplexing scheme for a HD-FDD mode.

Another purpose of the invention is to provide a method for optimizing emission and reception rates within the scope of implementing a duplexing scheme for a HD-FDD mode.

DISCLOSURE OF THE INVENTION

At least one the abovementioned purposes is achieved with a half-duplex (HD) frequency division duplexing (FDD) for data wireless communication systems, implementing an uplink and downlink prioritization respectively for a HD-FDD type mobile communication terminal during a transition between a downlink (DL) sub-frame, labelled n, and an uplink (UL) sub-frame, labelled n+1.

According to the invention, this method comprises a step of sending by a base station an allocation message, a step of receiving said allocation message by said terminal and a step of processing said allocation message by said terminal.

In a first embodiment of the invention, the allocation message uses downlink control information. These downlink control messages are DCI ("Downlink Control Information") messages in the LTE standard.

The allocation message can be an uplink allocation message for the sub-frame n+1, indicating that the start of the sub-frame n+1 is truncated by B symbols. This uplink allocation message is preferably sent in the sub-frame n−3.

The allocation message can be a downlink allocation message for the sub-frame n, indicating that the sub-frame n is truncated by A symbols. This downlink allocation message is preferably sent in the sub-frame n.

When the object is to promote the communication upstream link, the uplink allocation message indicates that the sub-frame n+1 is not truncated and the downlink allocation message indicates that the sub-frame n is truncated by a number A of symbols equal to the number N of symbols to be removed to avoid frame spanning.

When the purpose is to promote the communication downstream link, the uplink allocation message indicates that the sub-frame n+1 is truncated by a number B of symbols equal to the number N of symbols to be removed to avoid frame spanning and the downlink allocation message indicates that the sub-frame n is not truncated.

The respective numbers B of truncated symbols in the sub-frame n+1 and A of truncated symbols in the sub-frame n are determined such that A+B=N.

The duplexing method according to the invention can advantageously further comprise a step for transmitting from a base station (BS) the respective numbers B of truncated symbols in the sub-frame n+1 and A of truncated symbols in the sub-frame n. These numbers are explicitly respectively indicated in the frames n−3 and n respectively.

It can also further comprise a step for transmitting from a base station (BS) the number B of truncated symbols in the sub-frame n+1 and recording it in the frame n−3, and a step for calculating, within the mobile communication terminal, the number A of truncated symbols in the frame n, by subtracting (N−B) said number B from said number N of symbols to be removed.

In a second embodiment of the method according to the invention, the allocation message uses system information. This system information is the messages ("Sys Infos") in the LTE standard. The duplexing method according to the invention can then further comprise:
 a step for determining a number (N) of symbols to be removed from time advance (TA) information, and
 a step for calculating respective numbers (NDL, NUL) of symbols to be truncated in sub-frames respectively labelled n and n+1, such that N=NDL+NUL, by means of an algorithm developed from system information.

The duplexing method according to the invention is particularly implemented in a high rate wireless communication system according to the "Long Term Evolution" LTE standard.

According to another aspect of the invention, it is provided a base station (BS) within a wireless communication system with half-duplex (HD) frequency division duplexing (FDD) implementing an uplink and downlink prioritization respectively during a transition between a downlink (DL) sub-frame, labelled n, and an uplink (UL) sub-frame, labelled n+1, said base station (BS) being characterised in that it comprises means for emitting an allocation message arranged to be received by a terminal from said plurality of mobile terminals, said terminal comprising means for processing said allocation message by said terminal.

Moreover, the emitting means can be arranged to emit an allocation message using link control information.

Furthermore, the base station can be arranged to transmit via the allocation message the respective numbers B of truncated symbols in the sub-frame n+1 and A of truncated symbols in the sub-frame n which are explicitly respectively indicated in the frames n−3 and n respectively.

In addition, the base station can be arranged to transmit via the allocation message the number B of truncated symbols in the sub-frame n+1 and recording it in the frame n−3.

Advantageously, the base station can comprise means for emitting an allocation message using system information.

According to another aspect of the invention, it is provided a user equipment, in particular a station or a mobile communication terminal, connected to a wireless communication system with half-duplex (HD) frequency division duplexing (FDD) implementing a downlink and uplink prioritization respectively during a transition between a downlink (DL) sub-frame, labelled n, and an uplink (UL) sub-frame, labelled n+1, said user equipment being characterised in that it comprises means for receiving an allocation message emitted by a base station (BS) and means for processing said allocation message thus received.

Furthermore, the processing means can be arranged to process link control information transmitted via the allocation message.

Moreover, the processing means can be arranged to process the respective numbers B of truncated symbols in the sub-frame n+1 and A of truncated symbols in the sub-frame n, said numbers A, B having been respectively transmitted in the frames n−3 and n respectively.

In addition, the processing means can be arranged to calculate the number A of truncated symbols in the frame n, by subtracting (N−B) a number B of truncated symbols in the sub-frame n+1 from a number N of symbols to be removed, the number B having been transmitted in the frame n−3.

Advantageously, the processing means can be arranged to process system information transmitted via the allocation message.

Moreover, the user equipment can further comprise:
 means for determining a number (N) of symbols to be removed from time advance (TA) information, and means for calculating respective numbers (NDL, NUL) of symbols to be truncated in sub-frames respectively labelled n and n+1, such that N=NDL+NUL, by means of an algorithm developed from system information.

According to another aspect of the invention, it is provided a half-duplex (HD) frequency division duplexing (FDD) wireless communication system implementing an uplink and downlink prioritization respectively during a transition between a downlink (DL) sub-frame, labelled n, and an uplink (UL) sub-frame, labelled n+1, characterised in that it comprises at least one base station according to the invention communicating with a plurality of user equipment according to the invention.

Moreover, the at least one base station and at least one user equipment can be arranged to make use of link control information transmitted via an allocation message.

Moreover, at least one base station and at least one user equipment can be arranged to make use of system information transmitted via an allocation message.

Advantageously, the system according to the invention can further comprise, within the base station and/or within the plurality of user equipments:
means for determining a number (N) of symbols to be removed from time advance (TA) information, and
means for calculating respective numbers (NDL, NUL) of symbols to be truncated in sub-frames respectively labelled n and n+1, such that N=NDL+NUL, by means of an algorithm developed from system information.

Preferably, the system according to the invention can implement the "Long Term Evolution" LTE standard.

DESCRIPTION OF THE FIGURES

Further advantages and features of the invention will appear upon reading the detailed description of implementations and embodiments in no-way limiting, and the following appended drawings.

The invention is described within the scope of the LTE standard but is not restricted thereto. The invention should be intended as applicable to any radio standard needing a scheduling.

Figure 5:
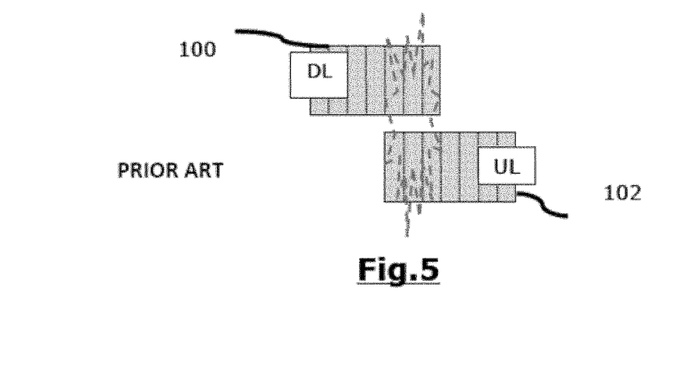
FIG. 5 illustrates a typical overlapping case of prior art, wherein part of a last downlink sub-frame and part of a first uplink sub-frame are represented.
Figure 6:
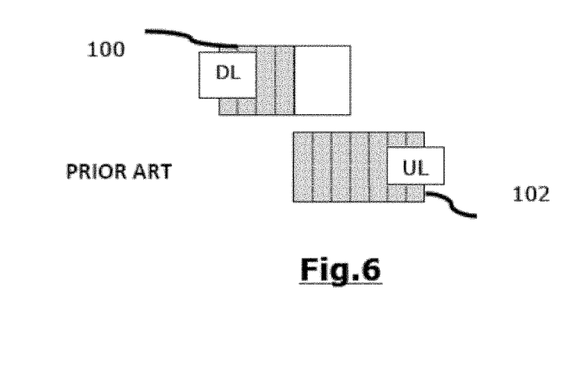
FIG. 6 illustrates a configuration of prior art in accordance with 3GPP standard, wherein a terminal chooses not to listen to the last three symbols emitted by a base station and starts to emit the first uplink sub-frame.

First, in reference to FIGS. 1, 5 and 6, the limits and drawbacks of duplexing methods of prior art will be explicated to better set out then the technical advantages of the method according to the invention.

It has been described above that a FD-HDD type terminal has to emit data with some anticipation of the duration noted TA ("Time Advance"). Consequently, there is a packet overlapping period during the transition between the end of the downlink period and the start of the uplink period from the terminal point of view.

The number N of symbols affected by the overlapping is thus:

$$N = \left\lceil \frac{TA}{OFDM\_Symbol\_Duration} \right\rceil$$

wherein TA is the anticipation duration and OFDM_Symbol_Duration is the duration of an OFDM ("Orthogonal Frequency-Division Multiplexing") symbol and ⌈x⌉ is the smallest integer not less than x.

Since a sub-frame is comprised of 12 or 14 OFDM symbols depending on the selected CP ("Cyclic Prefix"), the duration of an OFDM symbol is 71.33 μs when a frame is comprised of 14 symbols and 83.33 μs when a frame is comprised of 12 symbols.

It is represented in FIG. 5 an overlapping case wherein a part 100 of the last downlink sub-frame and a part 102 of the first uplink sub-frame are represented.

In the case represented, a cyclic prefix of 14 symbols has been selected and only the last time slot of the last sub-frame is represented (it will be reminded that a sub-frame comprises two 0.5 ms time slots). Thus, only the last 7 symbols of the last sub-frame are represented to highlight an overlapping of the last three symbols of the last sub-frame due to the duration TA.

Since a HD-FDD terminal cannot both receive the last 3 symbols of the last sub-frame 100 and emit the first 3 symbols of the first sub-frame 102, the 3GPP standard recommends that in this particular example, the FD-HDD terminal chooses not to listen to the last 3 symbols emitted by the base station and starts to emit the first uplink sub-frame, as is represented in FIG. 6. Parts 100 and 102 of the sub-frames are also represented but the choice not to listen to the last three symbols is illustrated therein. Thus, the 3GPP standard has the drawback to systematically favour the emission of the terminal with respect to its reception.

It will now be described a first embodiment of the duplexing method according to the invention, implementing the DCI format. It is considered a DL/UL transition occurring between frames n and n+1, where n is a "downlink" frame and n+1 is an "uplink" frame.

In order to improve the downstream link (which is systematically the direction degraded by the solution defined by the standard):

a UL allocation message (<<UL grant>>) is sent into the sub-frame n−3 for the UL frame n+1 (the UL allocation is made with a 4 ms advance) with an indication that the UL frame is truncated by B symbols: this enables the cellular terminal to listen to further symbols in the downstream link since it is allowed to start its emission later, and a DL allocation message is sent into the sub-frame n for the DL frame n with an indication A of the number of truncated symbols (value that can be null if the whole emission of the frame is desired to be forced).

Figure 2:
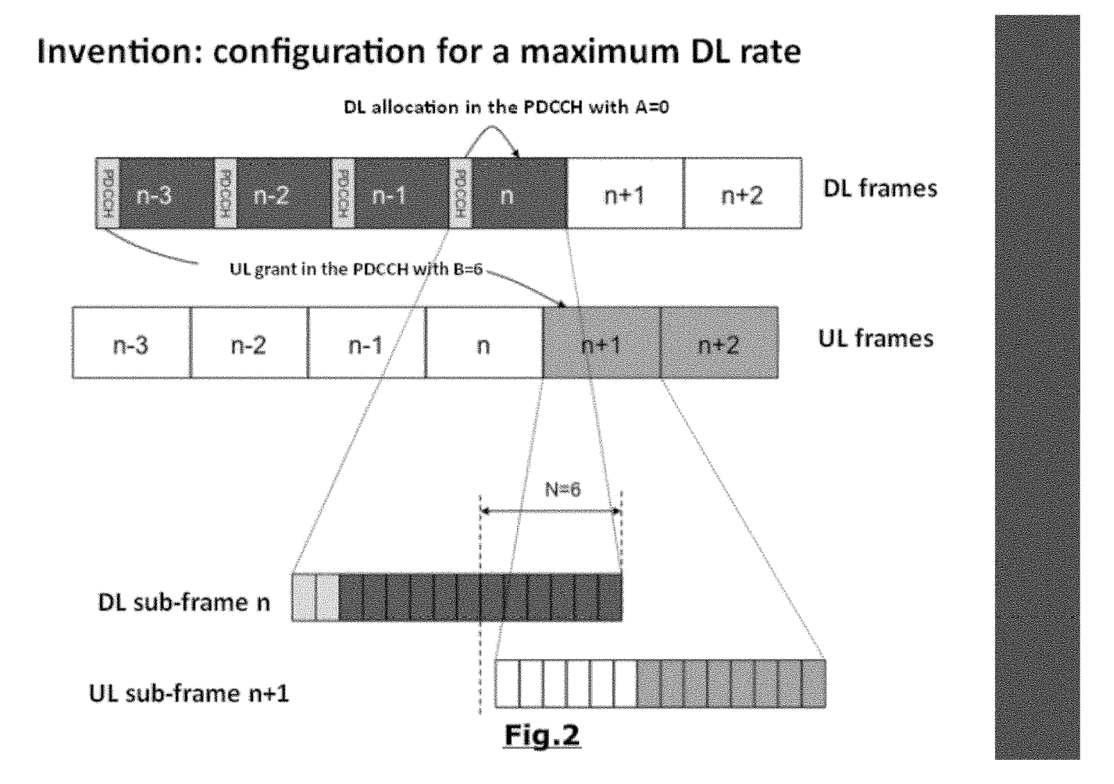
FIG. 2 illustrates, for the duplexing method according to the invention, a configuration arranged for a maximum downlink rate.
Figure 3:
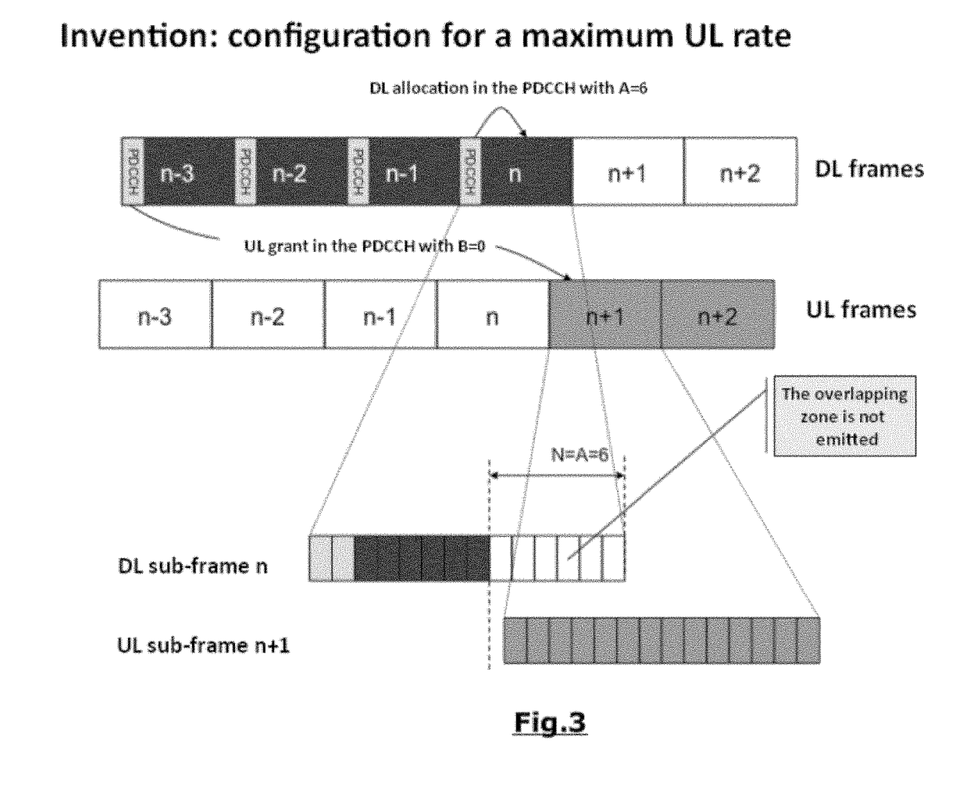
FIG. 3 illustrates, for the duplexing method according to the invention, a configuration arranged for a maximum uplink rate.

When the overlapping imposes to remove N symbols to avoid spanning, it is possible for example to:
promote the UL direction to the maximum (and have the UL rate equivalent to the standard solution), the base station BS will transmit: B=0, A=N, in reference to FIG. 3, promote the DL direction to the maximum (and thus obtain the DL rate higher than that allowed by the standard solution), the base station BS will transmit: B=N, A=0, in reference to FIG. 2.

Any intermediate solution (such that A+B=N) is also possible.

Both values of the number of truncated symbols (in the frame n−3 for the UL frame n+1 and in the frame n for the DL frame n) can also be signalled explicitly.

Only one value could also be possibly sent (preferably that sent to the frame n−3 for the cellular terminal to have information as soon as possible) and the cellular terminal would then deduce the second value by subtracting the signalled value from the value N of the total number of symbols to be removed that the cellular terminal has determined by virtue of Timing Advance.

With the method according to the invention, the base station can inform the terminal of the priority the terminal should give to reception or emission. In the present case, the terminal could then know if it has to favour the emission to the reception as is proposed by the 3GPP standard or if it has to implement another prioritization as those illustrated by FIGS. 7, 8 and 9.

Figure 7:
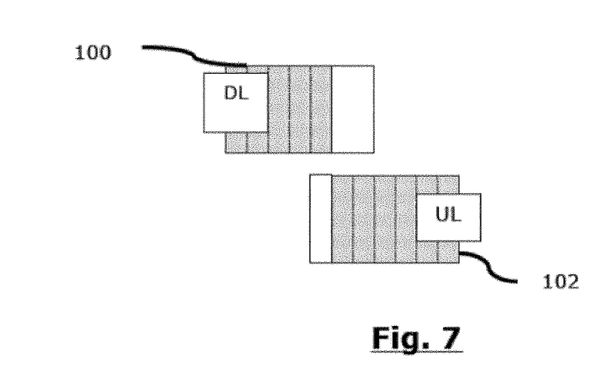
FIGS. 7 to 9 illustrate different configurations for implementing the duplexing method according to the invention.

FIG. 7 illustrates the possibility for the terminal to only ignore the last two symbols of the last downlink sub-frame to make up for the capability loss to emit a symbol on the uplink.

Figure 8:
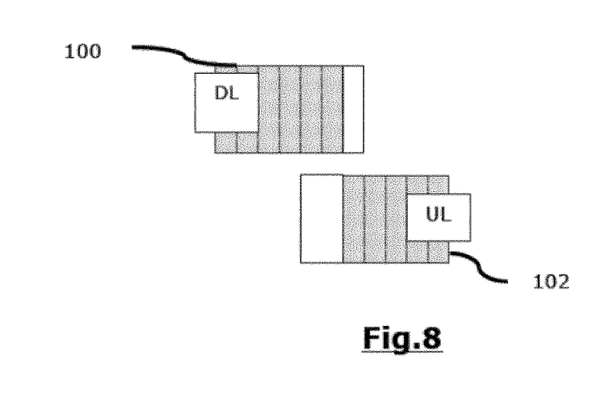

FIG. 8 illustrates the possibility for the terminal to only ignore the last symbol of the last downlink sub-frame to make up for the capability loss to emit two symbols on the uplink.

Figure 9:
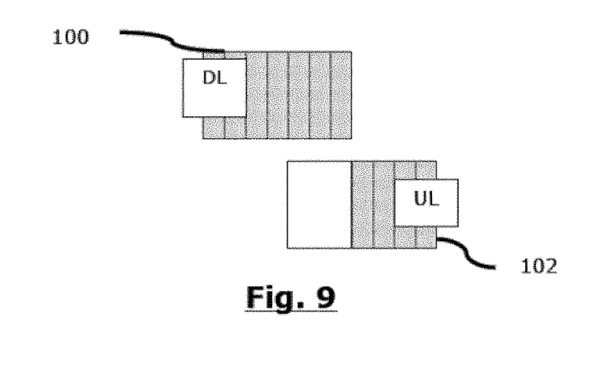

FIG. 9 illustrates the possibility for the terminal to receive all the symbols of the last downlink sub-frame to make up for the capability loss to emit three symbols on the uplink.

Thus, the method according to the invention is actually a method for dynamically prioritizing management of emission and reception blocks within the scope of implementing the duplexing scheme for a HD-FDD mode. It further enables the emission and reception rates to be optimized within the scope of implementing a duplexing scheme for the HD-FDD mode.

It will now be explained why the first four symbols of the last sub-frame allocated in downlink will never be in the overlapping zone which enables a DL allocation message to be sent into the sub-frame n for the DL frame n with an indication A of the number of truncated symbols.

The duration TA varies as a function of the distance of the cellular terminal from the base station. A distance of one kilometer generates a propagation delay approximately equal to 3.3 μs in LTE. A distance of 100 kilometers generates a propagation delay of approximately 333 μs. As a LTE sub-frame lasts 1 ms, it is observed that only the last downlink sub-frame could be affected by the overlapping period.

It is observed that a TA duration of 667 μs corresponds to 9.3, respectively 8 OFDM symbols depending on the selected prefix. Thus, for a distance lower than 100 kilometers and whatever the cyclic prefix selected, the first 4 symbols of the last uplink sub-frame are not affected by the implementation of the emission anticipation of the terminal.

Within the context of the invention, a way to signal the number of symbols which have been truncated is to add two parameters. These are a new row in both allocation tables for the allocation parameters in the upstream and downstream direction according to their format. These parameters indicate how many symbols the allocation has been reduced by, at the end for the downstream direction, and at the start for the upstream direction respectively.

These parameters are only used for the HD-FDD cellular terminals (the information is known from the system because it comes from the message describing the capabilities of the cellular terminal). Since these parameters only require a restricted number of bits (3 or 4 max), it is likely that it is not necessary to define a new DCI format. They are only used in a case where an uplink allocation occurs in a sub-frame just after a sub-frame containing an allocation in the downstream direction for the same cellular terminal.

The parameters are preferably selected such that the sum of the symbols reduced in the upstream direction and the symbols reduced in the downstream direction multiplied by the duration of one symbol is higher than or equal to the sum of the guard time (time needed by the cellular terminal to switch from de receive to transmit mode) and the anticipation necessary to compensate for the propagation time ("timing advance").

Given that the cellular terminal and the base station know the "timing advance", it is also provided that a single one of these parameters be signalled to the cellular terminal. The second value is then deduced by the cellular terminal with the relationship described above.

Allocation information in the upstream and downstream directions is communicated by the base station (BS or eNodeB) to the cellular terminal (UE—User Equipment) in the PDCCH ("Physical Downlink Control Channel") channel.

This channel occupies at each sub-frame the first symbols (from 1 to 3 depending on the information amount to be transported for bandwidths of 3, 5, 10, 15 and 20 MHz, from 2 to 4 for the LTE 1.4 MHz).

The PDCCH is used to transport DCI (Downlink Control Information) which has three possible uses:

Allocation in the downstream direction: the base station indicates to the cellular terminal the resources of the current sub-frame which are intended to it.

Allocation in the upstream direction: the base station indicates to the cellular terminal the resources that it could use in 4 sub-frames (=4 ms later) in the upstream direction.

Power control: the base station send information for adjusting the emission power of the cellular terminal for the signal to be received with a satisfactory level while restricting interferences.

The amount of information to be sent for these different usages is variable and different DCI formats have been defined to cover different needs (contiguous or fragmented allocation in the frequency domain, number of independent flows in MIMO ("layers")).

Figure 4:
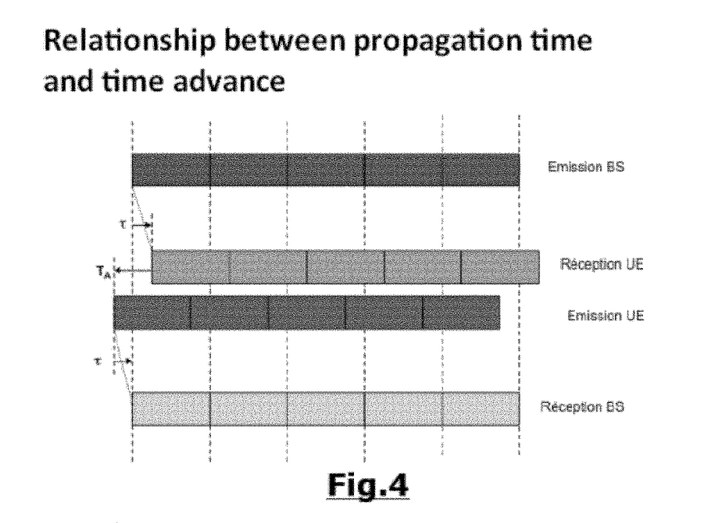
FIG. 4 illustrates, for the duplexing method according to the invention, a relationship between propagation time and time advance.

It will now be described, in reference to FIG. 4, another embodiment for implementing the duplexing method according to the invention, wherein system information, called "Sys Info" is used, to enable the mobile terminals to know how to truncate the DL and UL directions respectively.

The mobile terminal UE knows, via the "timing advance" TA, the number of OFDM symbols (N) to be removed. But it neither knows the number of symbols to be removed downstream (NDL), nor the number of symbols to be removed upstream (NUL). These numbers should fulfil the relationship N=NDL+NUL.

It could then be contemplated that in the Sys Info, the policy in force should be indicated on the relevant communication cell. In particular, the proportion of DL and UL symbols to be removed should be indicated as well as which direction (DL first or UL first) is to be favoured. By indicating for example DL=A, UL=B and DL first, the base station or the terminal could have as the selected algorithm, the following iterative algorithm:

Step I: start algorithm and set variables NDL and NUL to 0: NDL=0 and NUL=0

Step E: go to step DL, and then to step UL

Step DL: if N<A then NDL=N+NDL and then go to step F, else then NDL=A+NDL and N=N-A, and if moreover N=0, then go to step F Step UL: if N<B then NUL=N+NUL and then go to step F, else then NUL=B+NUL and N=N-B, and if moreover N=0 then go to step F Step B: go to step E Step F: the values NDL and NUL are now known, end of the algorithm.

Further, by indicating DL=A, UL=B and UL first, the previous algorithm is similar applicable with step UL placed before step DL.

Thus, with the proportions A and B (possibly null for either one) broadcasted in the Sys Info, it becomes possible to distribute the UL and DL losses.

By using the "Sys Info" messages, the flexibility gain is located at the entire cell and no longer at the communications as for DCI messages. Indeed, the "Sys Info" messages are intended to all the terminals of a cell and are sent less frequently than the DCI messages which in turn are intended to a particular terminal, and individual policy can be applied.

Of course, the invention is not limited to the examples just described and numerous alterations could be provided to these examples without departing from the scope of the invention.

The invention claimed is:

1. A half-duplex (HD) frequency division duplexing (FDD) method for a wireless communication system having an uplink and downlink prioritization scheme for an HD-FDD type mobile communication terminal, the method comprising:

communicating, by at least one base station (BS), with at least one of a plurality of mobile communication terminals of the wireless communication system;

sending, by the at least one base station, at least one allocation message to the at least one mobile communication terminal, dynamically when a transition occurs between a downlink (DL) sub-frame, labelled n, and an uplink (UL) sub-frame, labelled n+1, allocated for the communication between said mobile communication terminal and said base station;

receiving, by the at least one mobile communication terminal, the at least one allocation message, wherein the at least one allocation message includes one of a number A of symbols or a number B of symbols;

deducing, by the at least one mobile communication terminal, responsive to the number A of symbols being received, the number B of symbols and deducing, responsive to the number B of symbols being received, the number A of symbols; and processing, by the at least one mobile communication terminal, the at least one allocation message, wherein the at least one allocation message dynamically causes, at the mobile communication terminal, the sub-frame n to be truncated by the number A of symbols and the sub-frame n+1 to be truncated by the number B of symbols, A and B being integers such that A+B=N and such that N, defined by an anticipated duration of an emission from the mobile communication terminal to its reception at the BS divided by an interstitial symbol duration, is equal to a number of symbols to be removed to avoid frame spanning between downlink and uplink.

2. The method of claim 1, wherein the allocation message uses downlink control information.

3. The method of claim 2, wherein the at least one base station sends a first allocation message which is an uplink allocation message for the sub-frame n+1, indicating that the sub-frame n+1 is truncated by B symbols and is sent in a sub-frame labelled n-3.

4. The method of claim 2, wherein the at least one base station sends a second allocation message which is a downlink allocation message for the sub-frame n, indicating that the sub-frame n is truncated by A symbols and is sent in the sub-frame n.

5. The method of claim 4, arranged to promote the communication upstream link, wherein A equals N and B equals zero.

6. The method of claim 4, arranged to promote the communication downstream link, wherein A equals zero and B equals N.

7. The method of claim 2, wherein the number B of truncated symbols in the sub-frame n+1 and the number A of truncated symbols in the sub-frame n which are explicitly indicated in downlink control information sent in frame n-3 and in frame n, respectively.

8. The method of claim 2, wherein the number B of truncated symbols in the sub-frame n+1 is explicitly indicated in downlink control information sent in frame n-3, and the number A of truncated symbols in the frame n is calculated within the mobile communication terminal by subtracting the number B from the number N.

9. The method of claim 1, wherein the allocation message uses system information.

10. The method of claim 9, further comprising:

determining the number N of symbols to be removed from time advance information comprised in system information, and calculating the number A and the number B of symbols to be truncated in sub-frames n and n+1, respectively, such that N=A+B, by means of an algorithm based on said system information.

11. The method of claim 1, implemented in a high rate wireless communication system according to the "Long Term Evolution" (LTE) standard.

12. A base station (BS) of a wireless communication system implementing half-duplex (HD) frequency division duplexing (FDD) with an uplink and downlink prioritization scheme, said base station (BS) comprising, means for communicating with at least one of a plurality of mobile communication terminals of the wireless communication system; and means for emitting an allocation message to said at least one mobile communication terminal, dynamically when a transition occurs between a downlink (DL) sub-frame, labelled n, and an uplink (UL) sub-frame, labelled n+1, wherein said allocation message includes one of a number A of symbols or a number B of symbols such that said at least one mobile communication terminal deduces, responsive to the number A of symbols being received, the number B of symbols and deduces, responsive to the number B of symbols being received, the number A of symbols, wherein said allocation message is allocated for the communication between said at least one mobile communication terminal and said base station, and wherein said allocation message dynamically causes, at said at least one mobile communication terminal, the sub-frame n to be truncated by the number A of symbols and the sub-frame n+1 to be truncated by the number B of symbols, where A and B are integers such that A+B=N, and such that N, defined by an anticipated duration of an emission from the mobile communication terminal to its reception at the BS divided by an interstitial symbol duration, is equal to a number of symbols to be removed to avoid frame spanning between downlink and uplink.

13. The base station of claim 12, wherein the emitting means are arranged to emit an allocation message using link control information.

14. The base station of claim 12, arranged to transmit via the allocation message the number B of truncated symbols in the sub-frame n+1 and the number A of truncated symbols in the sub-frame n which are explicitly indicated in the frame n−3 and in the frame n, respectively.

15. The base station of claim 12, further comprising means for emitting an allocation message using system information.

16. A mobile communication terminal of a wireless communication system implementing half-duplex (HD) frequency division duplexing (FDD) with a downlink and uplink prioritization, the mobile communication terminal comprising,
means for communicating with at least one base station (BS) of the wireless communication system,
means for receiving an allocation message emitted by the at least one base station (BS) of the wireless communication system, dynamically when a transition occurs between a downlink (DL) sub-frame, labelled n, and an uplink (UL) sub-frame, labelled n+1, wherein said allocation message is allocated for the communication between said mobile communication terminal and said at least one base station, and wherein said allocation message includes one of a number A of symbols or a number B of symbols, and
means for processing the received allocation message such that, responsive to the number A of symbols being received, the number B of symbols is deduced and such that, responsive to the number B of symbols being received, the number A of symbols is deduced, said allocation message dynamically causing, at the mobile communication terminal, the sub-frame n to be truncated by the number A of symbols and the sub-frame n+1 to be truncated by the number B of symbols, where A and B are integers such that A+B=N, and such that N, defined by an anticipated duration of an emission from the mobile communication terminal to its reception at the BS divided by an interstitial symbol duration, is equal to a number of symbols to be removed to avoid frame spanning between downlink and uplink.

17. The mobile communication terminal of claim 16, wherein the processing means are arranged to process link control information transmitted via the allocation message.

18. The mobile communication terminal of claim 16, wherein the processing means are arranged to process the numbers B of truncated symbols in the sub-frame n+1 and the number A of truncated symbols in the sub-frame n, which are explicitly transmitted by the base station in the frames n−3 and in the frame n, respectively.

19. The mobile communication terminal of claim 16, wherein the processing means are arranged to calculate the number A of truncated symbols in the frame n by subtracting the number B of truncated symbols in the sub-frame n+1 from a number N of symbols to be removed, said number B being explicitly transmitted by the base station in the frame n−3.

20. The mobile communication terminal of claim 16, wherein the processing means are arranged to process system information transmitted via the allocation message.

21. The mobile communication terminal of claim 20, further comprising,
means for determining a number (N) of symbols to be removed from a time advance (TA) information comprised in the system information, and
means for calculating the number A and the number B of symbols to be truncated in the sub-frame labelled n and in the sub-frame labelled n+1, respectively, such that N=A+B, by means of an algorithm based on said system information.

22. A half-duplex (HD) frequency division duplexing (FDD) wireless communication system implementing an uplink and downlink prioritization scheme, comprising:
at least one base station (BS) communicating with at least one of a plurality of mobile communication terminals of the wireless communication system, the at least one mobile communication terminal comprising
means for receiving an allocation message emitted by the base station, dynamically when a transition occurs between a downlink (DL) sub-frame, labelled n, and an uplink (UL) sub-frame, labelled n+1, allocated for the communication between said at least one mobile communication terminal and said at least one base station, wherein said allocation message includes one of a number A of symbols or a number B of symbols, and
means for processing the received allocation message such that, responsive to the number A of symbols being received, the number B of symbols is deduced and such that, responsive to the number B of symbols being received, the number A of symbols is deduced,
wherein said allocation message dynamically causes, at the at least one mobile communication terminal, the sub-frame n to be truncated by the number A of symbols and the sub-frame n+1 to be truncated by the number B of symbols, where A and B are integers such that A+B=N, and such that N, defined by an anticipated duration of an emission from the mobile communication terminal to its reception at the BS divided by an interstitial symbol duration, is equal to a number of symbols to be removed to avoid frame spanning between downlink and uplink.

23. The system of claim 22, wherein the at least one base station and the mobile communication terminal are arranged to make use of link control information.

24. The system of claim 22, wherein the at least one base station and at least one user equipment are arranged to make use of system information.

25. The system of claim 24, further comprising, within the base station and/or within the plurality of mobile communication terminals:
means for determining a number (N) of symbols to be removed from time advance (TA) information, and
means for calculating the number A and the number B of symbols to be truncated in sub-frames labelled n and n+1, respectively, such that N=A+B, by means of an algorithm based on system information.

26. The system of claim 22, implementing the "Long Term Evolution" (LTE) standard.

* * * * *